(12) United States Patent
Shah

(10) Patent No.: US 12,430,079 B2
(45) Date of Patent: Sep. 30, 2025

(54) LOW-LATENCY CODE FETCHING FROM MEMORY

(71) Applicant: QUALCOMM INCORPORATED, San Diego, CA (US)

(72) Inventor: Parth Saurabhkumar Shah, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 7 days.

(21) Appl. No.: 18/477,450

(22) Filed: Sep. 28, 2023

(65) Prior Publication Data
US 2025/0110667 A1      Apr. 3, 2025

(51) Int. Cl.
*G06F 3/06*      (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0659; G06F 3/0604; G06F 3/0679
USPC ....................................................... 711/154
See application file for complete search history.

(56) References Cited

U.S. PATENT DOCUMENTS

| | | | |
|---|---|---|---|
| 2017/0308306 A1* | 10/2017 | Intrater | G06F 3/0656 |
| 2021/0279172 A1 | 9/2021 | Hung et al. | |
| 2022/0092004 A1* | 3/2022 | Intrater | G06F 3/0634 |
| 2022/0138109 A1* | 5/2022 | Hung | G06F 11/1048 |
| | | | 711/3 |

FOREIGN PATENT DOCUMENTS

CN          1862516 A    *  11/2006

OTHER PUBLICATIONS

Related PCT Pat. App. Ser. No. PCT/US2024/040602, filed on Aug. 1, 2024, entitled, "Low-Latency Code Fetching From Memory," issued by EPO acting as the ISA on Oct. 25, 2024, 17pages.

* cited by examiner

*Primary Examiner* — Jared I Rutz
*Assistant Examiner* — Wei Ma
(74) *Attorney, Agent, or Firm* — Smith Tempel Blaha LLC

(57) ABSTRACT

A memory device may respond to two types of read commands. When the memory device receives a first type of read command, the memory device may read data from a memory array beginning at an address indicated in association with the received read command. When the memory device receives a second type of read command, the memory device may begin reading data from a cache in the memory device. Data that is read from the memory array may also be stored in the cache.

16 Claims, 6 Drawing Sheets

LOW-LATENCY CODE FETCHING FROM MEMORY

DESCRIPTION OF THE RELATED ART

A computing device may include components such as processors, memory, input and output components, etc. Wireless computing devices may also include radio transceivers. The multiple components may be integrated on a "system-on-a-chip" ("SoC"). Wireless computing device technology increasingly involves devices that are smaller in size and more focused in task range than desktop and laptop computers, tablet computers, smartphones, etc. Such "small" computing devices may include wearables such as wristwatch-style and eyewear-based devices, etc., automotive devices, industrial and agricultural sensors and controllers, electric or water utility meters, and small household devices such as smart thermostats, smart garage door openers, etc. Small computing devices that communicate wirelessly via the Internet may be referred to as Internet-of-Things ("IoT") devices. As such computing devices may be designed for compact size as well as low cost, they may contain a relatively limited amount of memory. Minimizing power consumption may also be desirable due to limited battery capacity.

In an IoT or other small computing device, a processor may execute code directly from a non-volatile memory. That is, instead of loading a large section of code, such as a file, from a non-volatile memory into a random-access memory ("RAM") and then retrieving and executing the code in sequential, individually executable portions (e.g., instructions) from the RAM, a processor may retrieve and execute such sequential portions directly from the non-volatile memory, a behavior that may be referred to as "execute-in-place" or "XIP." The non-volatile memory may be NOR flash memory, due to advantages such as high read speed, high reliability, low implementation complexity, etc.

Code fetches from NOR flash memory incur latency that may depend in part upon the protocol under which the NOR flash controller operates. It would be desirable to minimize such code fetch latency.

SUMMARY OF THE DISCLOSURE

Systems, methods, and other examples of reading data from a memory device in a computing device are disclosed.

An exemplary method for reading data from a memory device may include receiving a memory device read command in the memory device. The method may also include determining whether a received memory device read command is a first type or a second type. The method may further include providing data from the memory device in response to the received memory device read command. Providing data from the memory device may include reading the data from a memory array beginning at an address associated with the received memory device read command when the received memory device read command is the first type. Providing data from the memory device may include reading the data from a cache in the memory device when the received memory device read command is the second type. The method may still further include reading data from the memory array into the cache in response to the received memory device read command.

An exemplary system in a memory device may include read control circuitry and a cache. The read control circuitry may be configured to determine whether a received memory device read command is a first type or a second type. The read control circuitry may further be configured to provide data from the memory device in response to the received memory device read command. The read control circuitry may be configured, when the received memory device read command is the first type, to read the data from a memory array beginning at an address associated with the received memory device read command. The read control circuitry may be configured, when the received memory device read command is the second type, to read the data from the cache. The read control circuitry may still further be configured to read data from the memory array into the cache in response to the received memory device read command.

An exemplary memory controller may include memory controller circuitry and read command selection circuitry. The memory controller circuitry may be configured to communicate storage transactions with a host system and also to communicate the storage transactions with a memory device. The read command selection circuitry may be configured to determine whether a host system read request indicates beginning at a next address continuing from a last address associated with a preceding host system read request. The read command selection circuitry may also be configured to indicate to the memory controller circuitry to use the first type of memory device read command when the host system read request does not indicate beginning at the next address continuing from the last address. The read command selection circuitry may further be configured to indicate to the memory control circuitry to use the second type of memory device read command when the host system read request indicates beginning at the next address continuing from the last address.

BRIEF DESCRIPTION OF THE DRAWINGS

In the Figures, like reference numerals refer to like parts throughout the various views unless otherwise indicated. For reference numerals with letter character designations such as "101A" or "101B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
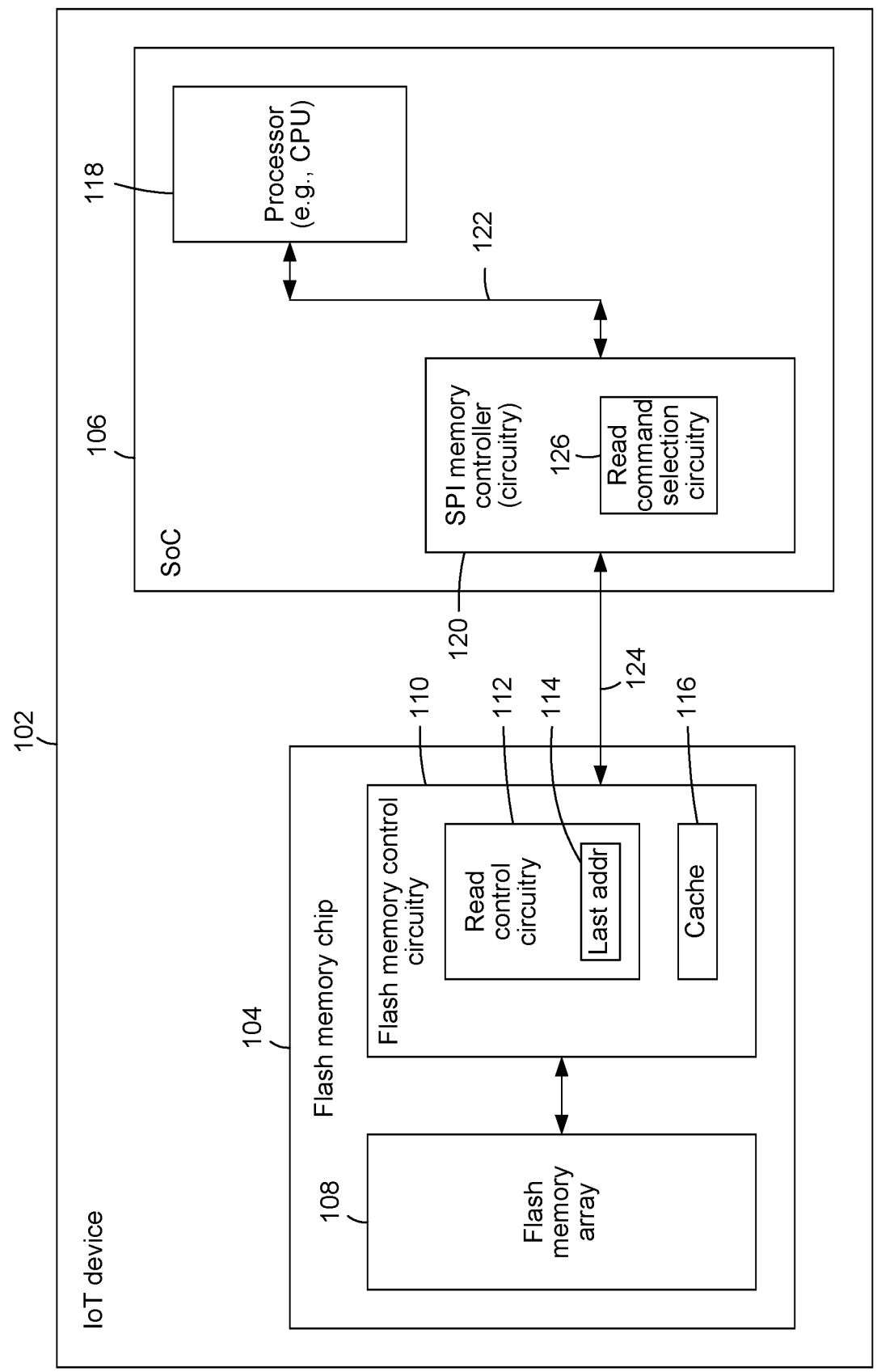
FIG. 1 is a block diagram of a system for reading data from a flash memory in a computing device, in accordance with exemplary embodiments.

As shown in FIG. 1, in an illustrative or exemplary embodiment a computing device 102 may include a flash memory chip 104 and a system-on-a-chip ("SoC") 106. Although in this exemplary embodiment the memory uses flash technology, in other examples of the solutions described herein the memory may be another technology, such as, for example, pseudo-static random access memory ("PSRAM").

The computing device 102 may be, for example, an Internet-of-Things ("IoT") device. The computing device 102 may be, for example, a wearable device, such as a wristwatch-style or eyewear-based device, or it may be an automotive device, an industrial or agricultural device, a scientific instrument, a medical device, an electric or water utility meter, a small household device such as smart thermostat, smart garage door opener, etc.

The flash memory chip 104 may utilize, for example, NOR flash technology. The flash memory chip 104 may include a flash memory array 108 (i.e., an array of flash storage cells, such as, for example, NOR flash storage cells). The flash memory chip 104 may also include memory control circuitry 110, such as NOR flash memory control circuitry. For purposes of clarity, some portions of the memory control circuitry 110 that are not directly related to the solutions described herein are not shown, such as, for example, circuitry that is configured to control writing data to the memory array 108 in response to write commands. With regard to the solutions described herein, it may be noted that the memory control circuitry 110 may include read control circuitry 112 that is configured to control reading data from the memory array 108 in response to read commands.

The read control circuitry 112 may include, among other features (not shown), a last address register 114. The operation of the last address register 114 is described below, but it may be noted here that the last address register 114 is configured to store an address (i.e., an indication of a storage location in the memory array 108). The memory control circuitry 110 may also include a cache 116. The operation of the cache 116 is described below, but it may be noted here that the cache 116 is configured to store data that has been read from the memory array 108.

The SoC 106 may include a processor 118. The processor 118 may be, for example, a central processing unit ("CPU"). In the course of performing tasks, the processor 118 may initiate memory transactions. For example, the processor 118 may initiate a write transaction to write data to the flash memory chip 104 or a read transaction to read data from the flash memory chip 104. In some examples of operation, the data stored in the flash memory chip 104 may be in the form of executable code or instructions. The processor 118 may read (i.e., fetch) such instructions from the flash memory chip 104 in a sequential manner and execute them in a correspondingly sequential manner, in accordance with the behavior known as "execute-in-place" or "XIP." XIP may be advantageous in IoT computing devices or other small computing devices having relatively limited amounts of memory. Although not shown in FIG. 1 for purposes of clarity, the computing device 102 may also include other memories, such as a dynamic random access memory ("DRAM"), and the processor 118 may also conduct memory transactions with such other memories.

The SoC 106 may also include a Serial Peripheral Interface ("SPI") controller 120, which may also be referred to herein as a memory controller or memory controller circuitry. The memory controller 120 may be coupled to the processor 118 via a host bus 122 and coupled to the flash memory chip 104 via an SPI bus 124. SPI is an example of a protocol that the flash memory chip 104 may use for memory transactions. The memory controller 120 may be configured to communicate memory transactions between the processor 118 (i.e., the host system) and the flash memory chip 104. The memory controller 120 may be configured to translate such memory transactions between a host bus protocol that the processor 118 may use and another bus protocol that the flash memory chip 104 may use. Two examples of host bus protocols that the processor 118 may use for memory transactions are Advanced High-Performance Bus ("AHB") and Advanced eXtensible Interface ("AXI").

For purposes of clarity, portions of the memory controller 120 that are not directly related to the solutions described herein are not shown or described in further detail. With regard to the solutions described herein, the memory controller 120 may include read command selection circuitry 126. Two types of read commands are used in the solutions described herein. The first type of read command may be referred to as a legacy read command, a legacy SPI read command, an SPI read command, etc. The second type of read command may be referred to as a continued-read command.

In association with a read transaction, the memory controller 120 may receive a host system read command from the processor 118. Also in association with the read transaction, the memory controller 120 may receive from the processor 118 an indication of a memory address or location from which to begin reading data. Further in association with the read transaction, the memory controller 120 may receive from the processor 118 an indication of an amount of data to read, starting at the indicated memory address. The memory controller 120 may receive any number of read transactions from the processor 118 in this manner. In some examples of operation, two or more successive read transactions may indicate contiguous memory read operations. That is, the next read transaction may indicate a starting memory address that is contiguous with (or continues from) a memory address from which data was read in the preceding read transaction. Nevertheless, in other examples of operation successive read transactions may indicate non-contiguous/continuous memory read operations. It may be appreciated that in an example in which the data read from the flash memory chip 104 are processor instructions, two successive read operations from non-contiguous addresses may be indicative of a jump in the instruction flow. Data may, of course, be read from non-contiguous memory addresses for other reasons.

The read command selection circuitry 126 may be configured to determine whether the next host system read transaction indicates beginning reading from the flash memory chip 104 at an address contiguous with (or continuing from) an address that was last read from in association with the preceding host system read transaction. The read command selection circuitry 126 may be configured to indicate that the memory controller circuitry 120 is to use the first type of memory device read command (i.e., the legacy read command) when the next host system read transaction does not indicate beginning reading from the flash memory chip 104 at an address contiguous with (or continuing from) an address that was last read from in association with the preceding host system read transaction. The read command selection circuitry 126 may also be configured to indicate that the memory controller circuitry 120 is to use the second type of memory device read command (i.e., the continued-read command) when the next host system read transaction indicates beginning reading from the flash memory chip 104 at an address contiguous with (or continuing from) an address that was last read from in association with the preceding host system read transaction.

In the flash memory chip 104, the read control circuitry 112 may be configured to determine whether a read command received from the memory controller 120 is the first type (legacy read command) or the second type (continued-read command). In response to the received read command, the read control circuitry 112 may be configured to read data from the memory array 108. Depending on the type of read command, the data that is returned to the memory controller 120 may be read directly from the memory array 108 or obtained from the cache 116. Regardless of whether the received read command is the first type (legacy read command) or the second type (continued-read command), the read control circuitry 112 may be configured to store the data read from the memory array 108 in the cache 116. When the read command is the first type, the read control circuitry 112 may be configured to return data directly read from the memory array 108 beginning at the address associated with the read command. That is, the read control circuitry 112 may return the data read from the memory array 108 in parallel with storing that data in the cache 116. However, when the read command is the second type, the read control circuitry 112 may be configured to return data from the cache 116 instead of directly from the memory array 108.

Also, when the read command is the second type, the read control circuitry 112 may be configured to begin reading data from the memory array 108 into the cache 116 beginning at a memory array address (which may be referred to as the "last address") stored in the last address register 114. The "last address" represents the last address read from the memory array 108 after reading all data responsive to the read command. When the read command is the second type, the read control circuitry 112 may return the data read from the cache 116 in parallel with storing further data read (beginning at the "last address") from the memory array 108 in the cache 116. The read control circuitry 112 may be configured to update the last address register 114 with the new "last address" after reading all data responsive to the read command.

Figure 2:
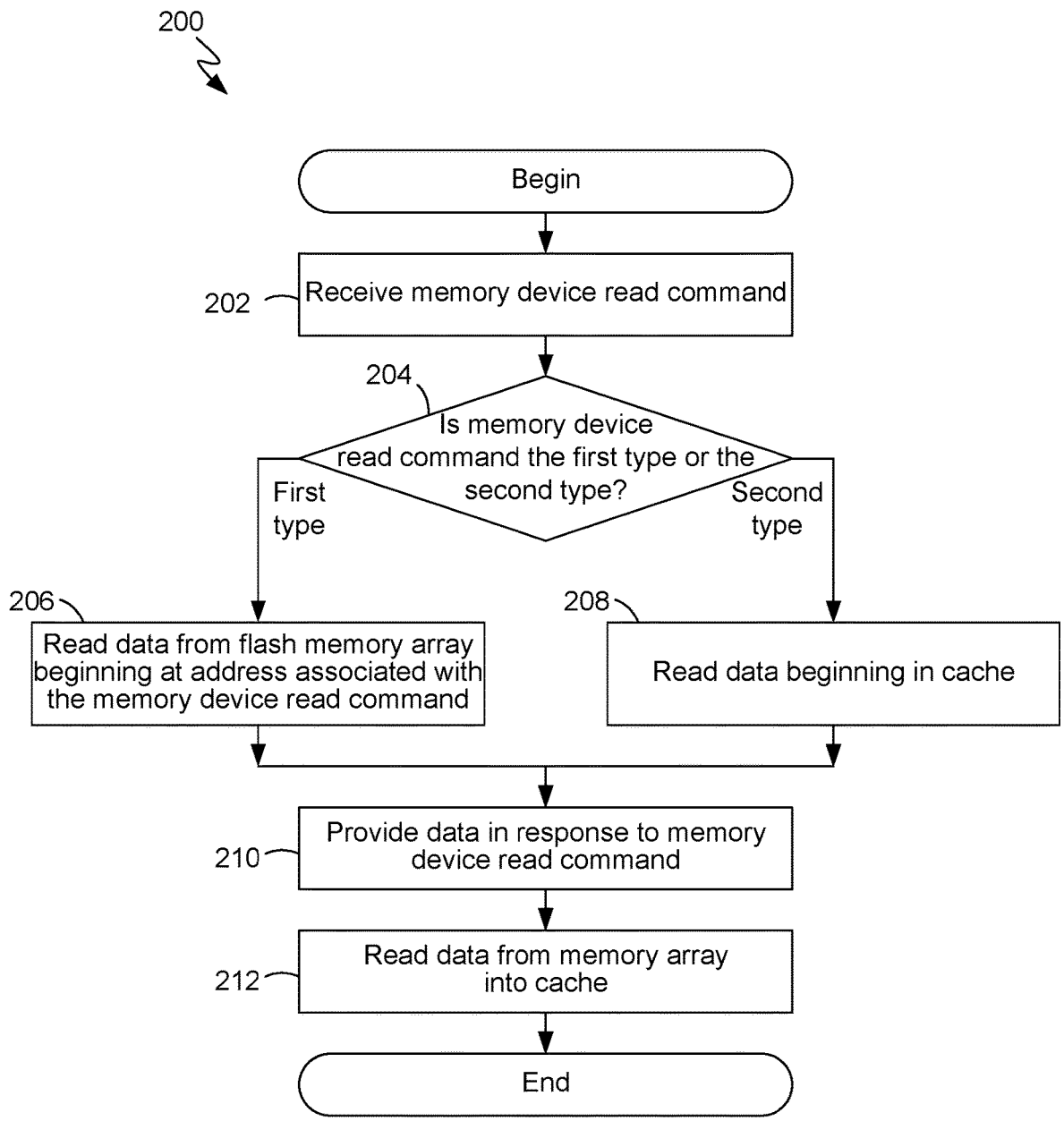
FIG. 2 is a flowchart illustrating a method for reading data from a flash memory in a computing device, in accordance with exemplary embodiments.

In FIG. 2, a method 200 for reading data from a flash memory device in a computing device is shown in flowchart form. A read operation in the above-described computing device 102 (FIG. 1) may be an example of the method 200. For example, the above-described read control circuitry 112 (FIG. 1) may control aspects of the read operation in the flash memory device 104.

As indicated by block 202, a memory device read command may be received in the flash memory device. As indicated by block 204, it may then be determined whether the received memory device read command is the first type or the second type.

Data may then be provided from the flash memory device in response to the received memory device read command. As indicated by block 206, when the received memory device read command is the first type, providing data from the flash memory device in response to the received memory device read command may include reading the data from a memory array beginning at an address associated with the received memory device read command. As indicated by block 208, when the received memory device read command is the second type, providing data from the flash memory device in response to the received memory device read command may include reading the data from a cache in the memory device.

As indicated by block 210, following block 206 or block 208, providing data in response to the received memory device read command may be completed. For example, the data that is read from the memory array may be sent to a host system that requested the data. As indicated by block 212, the data that is read from the memory array may also be read into the cache (i.e., stored in the cache).

Figure 3:
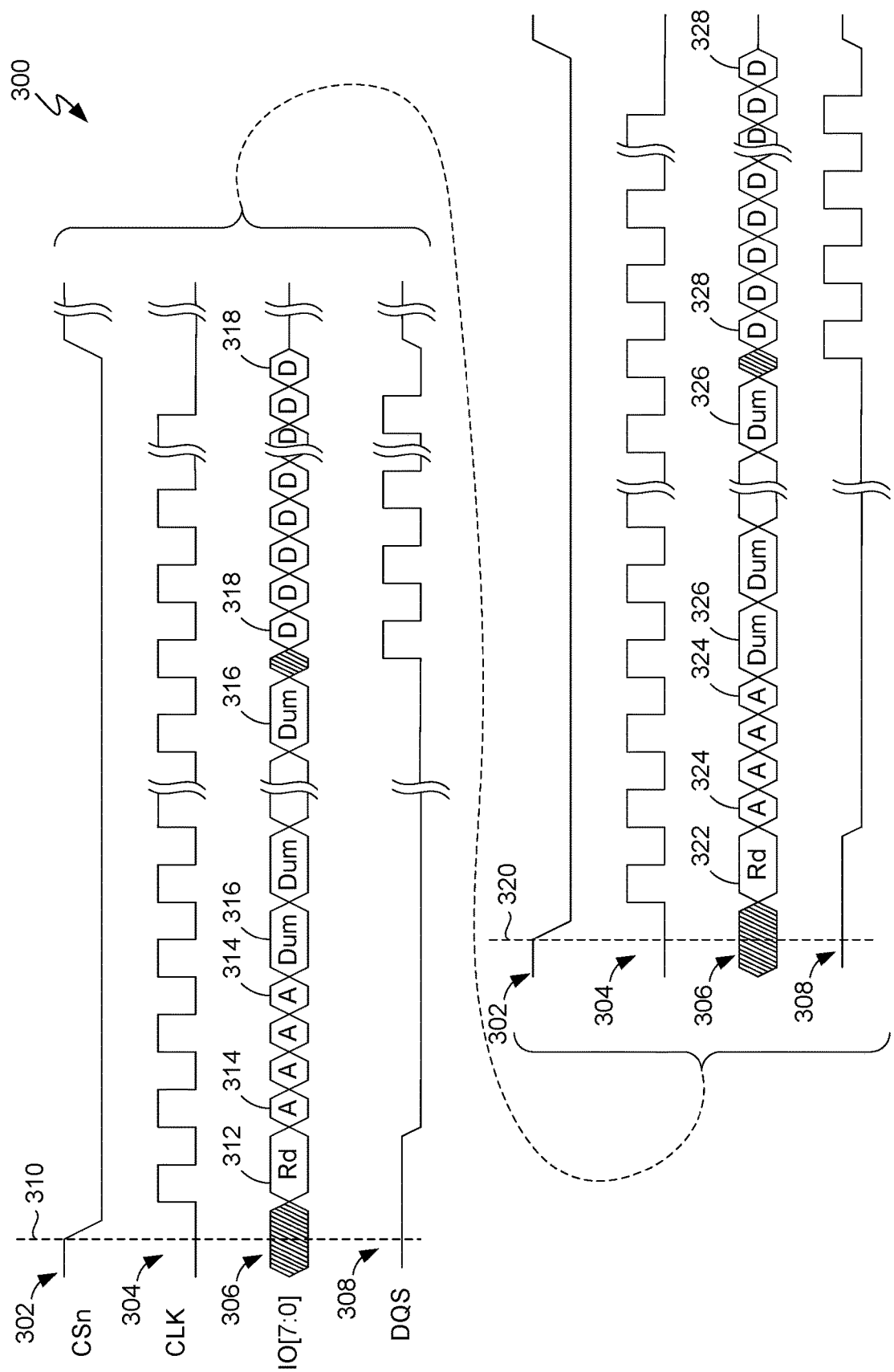
FIG. 3 is a timing diagram illustrating a sequence of two read operations, where both the first and second read operations use a first type of read command, in accordance with exemplary embodiments.

In FIG. 3, a timing diagram 300 illustrates an example of reading data from a flash memory device, such as the above-described flash memory device 104 (FIG. 1). The timing diagram 300 includes an active-low chip select signal ("CSn") 302, a clock signal ("CLK") 304, an input/output or "I/O" signal ("IO[7:0]") 306, and a data strobe signal ("DQS") 308, which operate in accordance with the SPI protocol. In the above-described computing device 102 (FIG. 1), the signals 302-308 may be included in the SPI bus 124. In the illustrated example, the I/O signal 306 consists of eight serial data paths that together operate in parallel in an SPI mode known as octal mode. Nevertheless, in other examples (not shown), such an SPI data signal may consist of fewer or more serial data paths that similarly operate together in parallel.

At a time 310, the memory controller 120 (FIG. 1) may assert the chip select signal 302 (i.e., transition from high to low), indicating the beginning of a memory operation. Also at time 310, the memory controller 120 may activate the clock signal 304. The chip select signal 302 and the clock signal 304 may be provided to the flash memory chip 104 over the SPI bus 124 (FIG. 1). After the time 310, the memory controller 120 may send a read command ("Rd") 312 to the flash memory chip 104 over the I/O signal 306 portion of the SPI bus 124 (FIG. 1) and may also transition the data strobe signal 308 low. In this example, the read command 312 is the first type: a legacy read command. Accordingly, following the read command 312, the memory controller 120 may send address portions ("A") 314 to the flash memory chip 104 over the I/O signal 306 portion of the SPI bus 124 (FIG. 1). The address portions 314 collectively indicate the address in the flash memory chip 104 from which to begin reading data. In the illustrated example the address consists of four address portions 314. Nevertheless, in other examples (not shown), such an address may consist of fewer or more address portions.

Then, following the address portions 314, the memory controller 120 (FIG. 1) may wait some number of dummy cycles ("Dum") 316. That is, during that number of cycles of the clock signal 304, the memory controller 120 may send information having any value (i.e., dummy data) to the flash memory chip 104 over the I/O signal 306 portion of the SPI bus 124 (FIG. 1). The number of dummy cycles is related to the memory device read latency. Stated another way, the dummy cycles give the flash memory chip 104 the time needed to access the requested data. The number of dummy cycles 316 that the memory controller 120 needs to wait can readily be determined by one of ordinary skill in the art. In an example, there may be 20 dummy cycles 316 (not all of which are shown for purposes of clarity). The above-described signal pattern of a read command 312 followed by some number of address portions 314, followed by some number of dummy cycles 316, is described by the SPI protocol. In response to this signal pattern, the read control circuitry 112 (FIG. 1) may read the requested data from the memory array 108, beginning at the indicated address. The requested data may be retrieved in portions as it is read from the memory 108.

Following the last dummy cycle 316, the read control circuitry 112 (FIG. 1) may continuously toggle the data strobe signal 308 at a rate corresponding to the clock signal 304 frequency. On each transition or edge of the data strobe signal 308, the read control circuitry 112 may send the next one of the data portions ("D") 318 to the memory controller 120. The successive data portions 318 represent data read from successive addresses in the memory array 108. The read control circuitry 112 may toggle the data strobe signal 308 a number of times corresponding to the amount of data the memory controller 120 is requesting, based on the clock signal 304 provided by the memory controller 120. Any number of data portions 318 may be provided to the memory controller 120 in this manner, such as, for example, 64 data portions 318 (not all of which are shown in FIG. 3 for purposes of clarity). The data portions 318 may be referred to collectively as a block or burst, etc. In an example in which 64 data portions 318 are read, the read control circuitry 112 may increment the address from which it reads the next data portion 318 with each transition of the data strobe signal 308.

In parallel with sending the data portions 318, the read control circuitry 112 (FIG. 1) may read data from the memory array 108 (FIG. 1) into the cache 116 (FIG. 1), beginning at an address in the memory array 108 indicated by the address stored in the last address register 114 (FIG. 1). Reading data into the cache 116 may be done in preparation for a continued-read operation, which may occur in other (not shown in FIG. 3) examples of operation as described below. When the read control circuitry 112 has toggled the data strobe signal 308 a number of times equal to the number of data portions 318 that the memory controller 120 is requesting (and thus the data burst has been sent), the memory controller 120 may deactivate the clock signal 304 and de-assert the chip select signal 302. The read control circuitry 112 may then cease toggling the data strobe signal 308. The above-described pattern of signals represents one read operation. In the illustrated example, in which two successive read operations are illustrated, this read operation may be referred to as the first read operation. When the first read operation is completed, the address from which the last data portion 318 was read may be stored in the last address register 114 (FIG. 1).

At any time 320 after the first read operation is completed, the second read operation may begin. The second read operation may be represented by the same pattern of signals as the above-described first read operation. Accordingly, the memory controller 120 (FIG. 1) may assert the chip select signal 302 and activate the clock signal 304. Then, the memory controller 120 may send a second read command ("Rd") 322 to the flash memory chip 104 and transition the data strobe signal 308 low. In this example, the second read command 322 is also the first type: a legacy read command. Accordingly, following the read command 322, the memory controller 120 may send address portions ("A") 324, indicating the address in the memory chip 104 from which to begin reading data.

Then, following the address portions 324, the memory controller 120 may wait a number of dummy cycles ("Dum") 326. In response to the read command 322 and address portions 324, and after the dummy cycles 326, the read control circuitry 112 (FIG. 1) may read the requested data from the flash memory array 108, beginning at the indicated address.

Following the last dummy cycle 326, read control circuitry 112 (FIG. 1) may begin toggling the data strobe signal 308 based on the clock signal 304 provided by the memory controller 120 (FIG. 1). On successive edges of the toggled data strobe signal 308, the read control circuitry 112 (FIG. 1) may send successive data portions ("D") 328 to the memory controller 120 (FIG. 1). In parallel with sending the data portions 328, the read control circuitry 112 (FIG. 1) may read data from the memory array 108 into the cache 116 (FIG. 1), beginning at an address in the memory array 108 indicated by the address stored in the last address register 114 (FIG. 1). Reading data into the cache 116 may be done in preparation for a continued-read operation, which may occur in other (not shown in FIG. 3) examples of operation as described below. When the read control circuitry 112 has toggled the data strobe signal 308 a number of times equal to the number of data portions 328 that the memory controller 120 is requesting (and thus the data burst has been sent), the memory controller 120 may deactivate the clock signal 304 and de-assert the chip select signal 302. The read control circuitry 112 may then cease toggling the data strobe signal 308. When the second read operation is completed, the address from which the last data portion 328 was read may be stored in the last address register 114.

Although two successive legacy read operations are shown in FIG. 3, in other examples there could be any number of successive legacy read operations. Each such legacy read operation may incur latency relating to providing the address and waiting the dummy cycles. It may be appreciated that the total latency incurred in providing all of the data requested over the successive read operations is related to the number of successive read operations. That is, the greater the number of successive legacy read operations, the greater the total latency.

Figure 4:
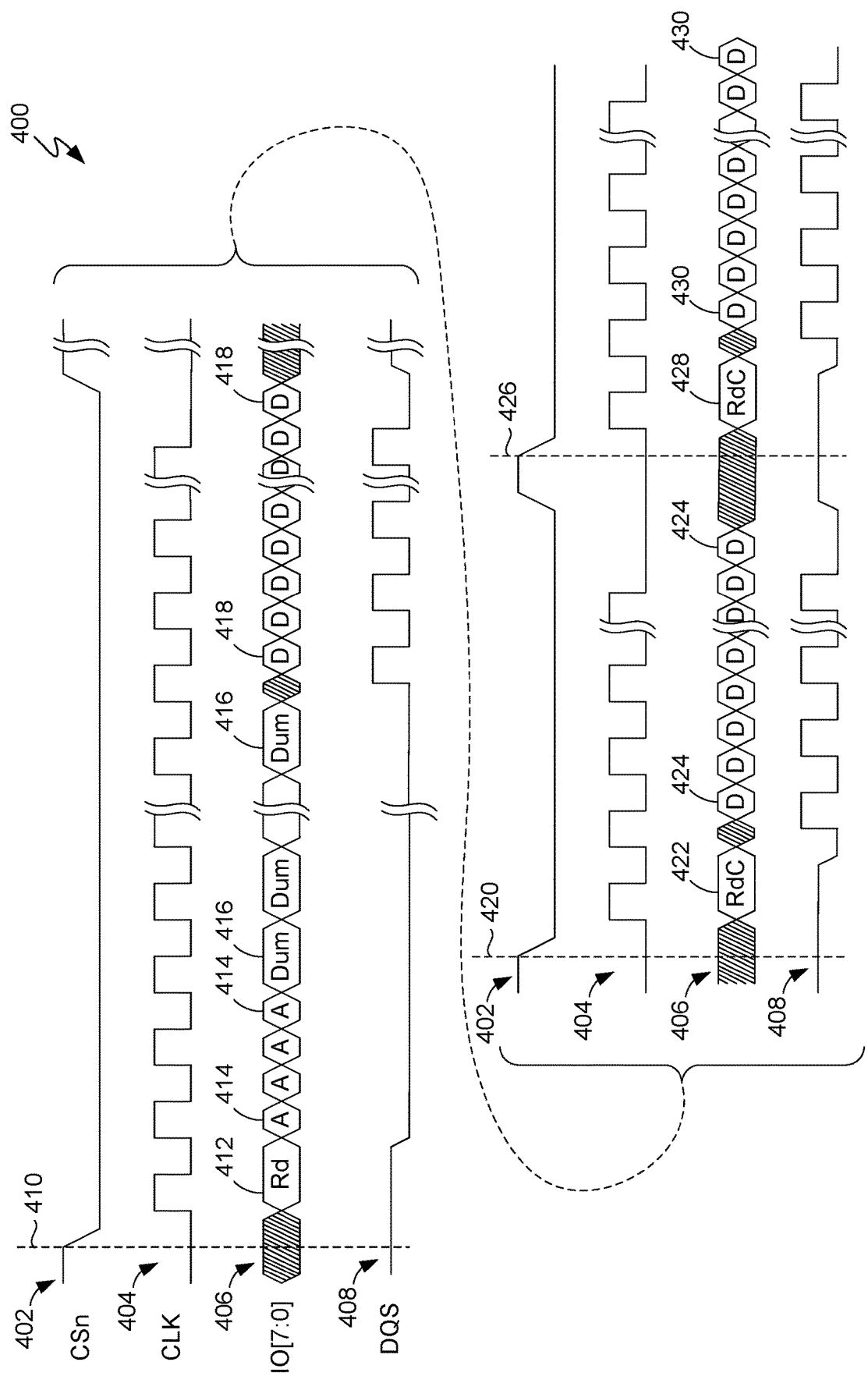
FIG. 4 is a timing diagram illustrating a sequence of read operations, where the first read operation uses a first type of read command, a second read operation uses a second type of read command, and a third read operation also uses the second type of read command, in accordance with exemplary embodiments.

In FIG. 4, a timing diagram 400 illustrates another example of reading data from a flash memory device, such as the above-described flash memory device 104 (FIG. 1). The timing diagram 400 includes an active-low chip select signal ("CSn") 402, a clock signal ("CLK") 404, an I/O signal ("IO[7:0]") 406, and a data select signal ("DQS") 408. The timing diagram 400 may be similar in some aspects to the above-described timing diagram 300 (FIG. 3), and to the extent they are similar such aspects are not repeated here in similar detail. A difference is that while in the example illustrated in FIG. 3 a first legacy read operation is followed by a second legacy read operation, in the example illustrated in FIG. 4 a legacy read operation is followed by a first continued-read operation, which is followed by a second continued-read operation.

The legacy read operation may begin with the memory controller 120 (FIG. 1) asserting the chip select signal 402 at a time 410 and activating the clock signal 404. The memory controller 120 may then send a legacy read command ("Rd") 412 to the flash memory chip 104 (FIG. 1) and transition the data strobe signal 408 low. Following the legacy read command 412, the memory controller 120 may send address portions ("A") 414, indicating the address in the memory chip 104 from which to begin reading data.

Then, following the address portions 414, the memory controller 120 may wait a number of dummy cycles ("Dum") 416. In response to the legacy read command 412 and address portions 414, and after the dummy cycles 416, the read control circuitry 112 (FIG. 1) may read the requested data from the memory array 108, beginning at the indicated address.

Following the last dummy cycle 416, the read control circuitry 112 (FIG. 1) may begin toggling the data strobe signal 408 based on the clock signal 404 provided by the memory controller 120 (FIG. 1). On successive edges of the toggled data strobe signal 408, the read control circuitry 112 (FIG. 1) may send successive data portions ("D") 418 read from the memory array 108 (FIG. 1) to the memory controller 120. In parallel with sending the data portions 418, the read control circuitry 112 may read data from the memory array 108 into the cache 116, beginning at an address in the memory array 108 indicated by the address stored in the last address register 114 (FIG. 1). When the read control circuitry 112 has toggled the data strobe signal 408 a number of times equal to the number of data portions 418 that the memory controller 120 is requesting (and thus the data burst has been sent), the memory controller 120 may deactivate the clock signal 404 and de-assert the chip select signal 402. The read control circuitry 112 may then cease toggling the data strobe signal 408. When the legacy read operation is completed, the address from which the last data portion 418 was read may be stored in the last address register 114.

The first continued-read operation following the legacy read operation may begin with the memory controller 120 (FIG. 1) asserting the chip select signal 402 at a time 420 and activating the clock signal 404. The memory controller 120 may then send a continued-read command ("RdC") 422 to the flash memory chip 104 (FIG. 1). Unlike with the legacy read command, with the continued-read command the memory controller 120 does not need to send an address or dummy cycles. Rather, the read control circuitry 112 may begin toggling the data strobe signal 408 (e.g., after a small amount of delay relating to switching the direction of the I/O signal 406 from receiving to sending). On successive edges of the data strobe signal 408, the read control circuitry 112 (FIG. 1) may send successive data portions ("D") 424 from the cache 116 to the memory controller 120. In parallel with sending data portions 424 from the cache 116 (FIG. 1), the read control circuitry 112 (FIG. 1) may read data from the memory array 108 (FIG. 1) into the cache 116, beginning at an address in the memory array 108 indicated by the address stored in the last address register 114 (FIG. 1).

When the read control circuitry 112 (FIG. 1) has toggled the data strobe signal 408 a number of times equal to the number of data portions 424 that the memory controller 120 is requesting (and thus the data burst has been sent), the memory controller 120 may deactivate the clock signal 404 and de-assert the chip select signal 402. The read control circuitry 112 may then cease toggling the data strobe signal 408, thus completing the first continued-read operation. When the first continued-read operation is completed, the address from which the last data portion 424 was read may be stored in the last address register 114 (FIG. 1). Note that following the completion of each read operation, regardless of whether that is a legacy read operation or a continued-read operation, the read control circuitry 112 may store in the last address register 114 the address in the memory array 108 from which data was last read.

At any time after the first continued-read operation is completed, a second continued-read operation may be begun. Accordingly, the memory controller 120 (FIG. 1) may assert the chip select signal 402 at a time 426 and activate the clock signal 404. The memory controller 120 may then send a continued-read command ("RdC") 428 to the flash memory chip 104. The read control circuitry 112 (FIG. 1) may begin toggling the data strobe signal 408 (e.g., after a small amount of delay relating to switching the direction of the I/O signal 406 from receiving to sending). On successive edges of the data strobe signal 408, the read control circuitry 112 may send successive data portions 430 from the cache 116 to the memory controller 120. Note that these data portions 430 begin with data that was read from the memory array 108 into the cache 116 while the data portions 424 were being sent from the cache 116 in response to the first continued-read operation. In parallel with sending the data portions 430 from the cache 116, the read control circuitry 112 may read data from the memory array 108 into the cache 116, beginning at an address in the memory array 108 indicated by the address stored in the last address register 114 (FIG. 1).

When the read control circuitry 112 (FIG. 1) has toggled the data strobe signal 408 a number of times equal to the number of data portions 430 that the memory controller 120 is requesting (and thus the data burst has been sent), the memory controller 120 may deactivate the clock signal 404 and de-assert the chip select signal 402. The read control circuitry 112 may then cease toggling the data strobe signal 408, thus completing the second continued-read operation. When the second continued-read operation is completed, the address from which the last data portion 430 was read may be stored in the last address register 114 (FIG. 1).

The cache 116 (FIG. 1) may have any size. That is, the cache 116 may be configured to store X bytes, where X is at least two. Nevertheless, it may be advantageous for X to equal the sum of the number of address cycles and dummy cycles. The cache 116 may be configured to operate on a first-in first-out or "FIFO" basis. Accordingly, when a legacy read operation is completed, there will be X bytes of residual data in the cache 116. Then, when a continued-read command is received following such completion of a legacy read operation, the read control circuitry 112 may begin sending data directly from the cache 116 on the SPI bus 124 and, in parallel with such sending, the read control circuitry 112 may begin reading data from the memory array 108 into the cache 116 beginning at the address indicated by the last address register 114.

It may be appreciated that the same data could be read by performing successive legacy read operations as by performing one or more continued-read operations after an initial legacy read operation. Nevertheless, using the continued-read operation provides a lower-latency and lower-power alternative to performing successive legacy read operations. Although in the example shown in FIG. 4 a legacy read operation is followed by a first continued-read operation, which is followed by a second continued-read operation, in other examples a legacy read operation could be followed by any number of successive continued-read operations. It may be appreciated that the total latency incurred in providing all of the data requested over the successive read operations is lower when the continued-read operation is used instead of the legacy read operation. The address and dummy cycles in a legacy read operation also incur a power cost that is not incurred when a continued-read operation is used instead.

Referring again to FIG. 1, the solutions described herein may be advantageous when the processor 118 is fetching executable instructions from the flash memory chip 104, although the solutions are not limited to such XIP operation. In XIP operation, many instructions may follow each other in sequential locations or addresses in the memory array 108. That is, the next instruction that the processor 118 is to execute may be stored in the next location in the memory array 108. So long as the logic flow of instructions is sequential in this manner, the continued-read command may be used to continue to read (i.e., fetch) instructions. Nevertheless, there may be instances in which the logic flow of processor instructions involves a jump. A jump instruction instructs the processor 118 to fetch the next instruction from a location or address that is not the next in the sequence of locations or addresses in the memory array 108. In such an instance (i.e., a jump to another address in the memory array 108), the legacy read command may be used to read the next instruction from the other address.

Figure 5:
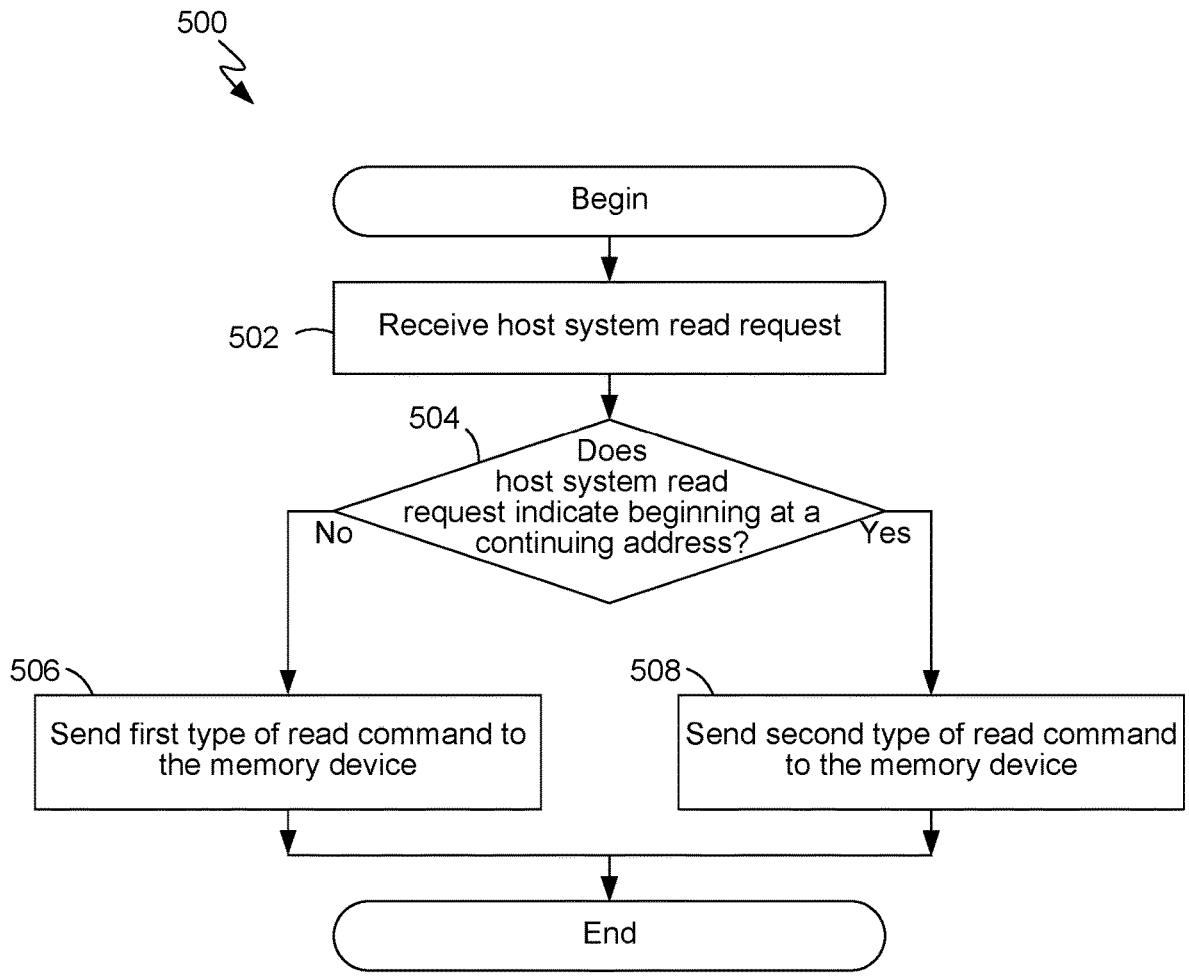
FIG. 5 is a flowchart illustrating a method for providing a read command to a flash memory in a computing device, in accordance with exemplary embodiments.

In FIG. 5, a method 500 for translating memory transactions between a host bus protocol and another bus protocol, such as SPI, is shown in flowchart form. For example, the memory controller 120 (FIG. 1) may be configured to operate in accordance with the method 500. As indicated by block 502, a host system read request or transaction may be received. For example, the memory controller 120 may receive a read request from the processor 118 via the host bus 122. As indicated by block 504, it may be determined whether this host system read request indicates beginning at a continuing (i.e., next) address. A continuing or next address is an address that is next in a sequence of addresses ending at the last (i.e., previous) address associated with a preceding host system read request. If it is determined that the host system read request does not indicate beginning at a continuing address, then the first type of read command may be sent to the memory device, as indicated by block 506. If it is determined that the host system read request indicates beginning at a continuing address, then the second type of read command may be sent to the memory device, as indicated by block 508.

For example, the memory controller 120 may receive a ("current") read request indicating to read a burst of data from 64 addresses in the flash memory chip 104, beginning at an address A. If the memory controller 120 determines that the address A−1 was the last address from which data was read in association with a read request preceding the current read request, then the memory controller 120 may send a continued-read command to the flash memory chip 104. If the memory controller 120 determines that an address other than A−1 was the last address from which data was read in association with a read request preceding the current read request, then the memory controller 120 may send a legacy read command to the flash memory chip 104. As described above, the memory controller 120 may send a legacy read command in accordance with the SPI protocol, including, for example, providing one or more address portions, dummy cycles, etc. The memory controller 120 may send a continued-read command without also providing such address portions and dummy cycles. It may be appreciated that the use of the continued-read command instead of the legacy read command, by obviating providing an address and dummy cycles, may reduce read latency and power consumption.

Figure 6:
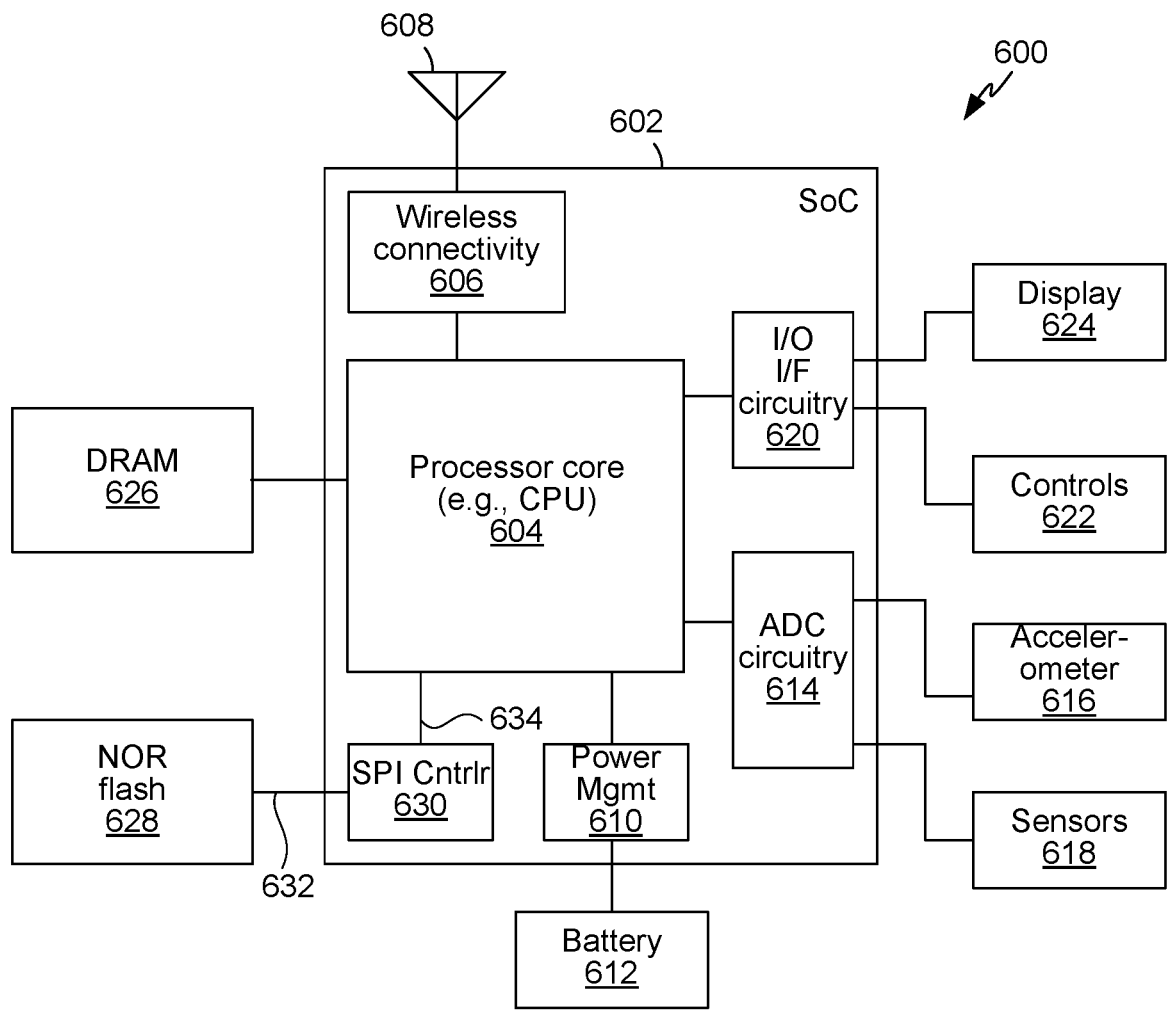
FIG. 6 is a block diagram of a computing device having a system for reading data from a flash memory, in accordance with exemplary embodiments.

As shown in FIG. 6, in an illustrative or exemplary embodiment, systems, methods and other examples for reading data from a memory in a computing device may be provided in a wearable computing device 600. The wearable computing device 600 may be in the form of, for example, eyewear, a wristwatch, etc. The wearable computing device 600 may be an example of the above-described computing device 102 (FIG. 1).

The wearable computing device 600 may include a system-on-a-chip ("SoC") 602. For purposes of clarity, some interconnections among SoC components or circuitry, such as data communication buses, signal lines, etc., are not shown in FIG. 6. The SoC 602 may include a processor core 604, such as, for example, a CPU. (Although in the illustrated example the wearable computing device 600 may have only a single processor core 604, in other examples such a computing device may have multiple processing cores.) Various other components, such as the exemplary components or circuitry described below, may be coupled to the processor core 604 via buses or other data interconnections.

The SoC 602 may also include wireless connectivity circuitry 606 and an associated antenna 608, which may enable wireless Internet, Bluetooth®, or other wireless communication. The SoC 602 may further include power management circuitry 610, which may be coupled to a battery 612. The SoC 602 may include analog-to-digital conversion ("ADC") circuitry 614. The wearable computing device 600 may include an accelerometer 616 and various sensors 618 that may be coupled to the processor core 604 via the ADC circuitry 614. The SoC 602 may include I/O interface circuitry 620. The wearable computing device 600 may include various user-operable controls 622 (e.g., a button) and a display 624. In an example in which the wearable computing device 600 is in the form of eyewear, the display 624 may be a heads-up display ("HUD") that may be used in augmented virtual reality applications. The controls 622 and display 624 may be coupled to the processor core 604 via the I/O interface circuitry 620.

The wearable computing device 600 may also include a working memory, such as, for example, DRAM 626. The wearable computing device 600 may further include non-volatile memory, such as, for example, a NOR flash memory chip 628 coupled to the SoC 602. The NOR flash memory chip 628 may be used to store not only data but also processor-executable code or instructions, as described above. Benefits of NOR flash may include faster read operation speed and higher data retention reliability than some other non-volatile memory technologies. Nevertheless, in another example (not shown) the non-volatile memory could be pseudo-static RAM ("PSRAM"). The NOR flash memory chip 628 may be an example of the above-described flash memory chip 104 (FIG. 1). The SoC 602 may include an SPI controller 630. The SPI controller 630 may be an example of the above-described memory controller 120 (FIG. 1). The NOR flash memory chip 628 may be coupled to the SoC 602 via an SPI bus 632. The SPI controller 630 may be coupled to the processor core 604 via a host bus 634. Although for purpose of clarity the host bus 634 is conceptually shown as a point-to-point connection between the SPI controller 630 and the SoC 602, it should be understood that any number of components, including some of the SoC components described above, may also be coupled to such a host bus.

Although any type of data may be stored in the NOR flash memory chip 628, in an example of operation at least some of the data stored in the NOR flash memory chip 628 may comprise instructions executable by the processor core 604. To fetch instructions, the processor core 604 may issue read requests to the NOR flash memory chip 628 via the SPI controller 630.

It should also be understood that the wearable computing device 600 is only an example of a computing device in which systems, methods and other examples of reading data from a memory device may be provided. As described above with regard to FIG. 1, other examples include other types of wearables such as wristwatch-style devices. Still other examples include other IoT devices such as automotive devices, industrial and agricultural sensors and controllers, electric or water utility meters, and small household devices such as smart thermostats, smart garage door openers, etc.

Implementation examples are described in the following numbered clauses.

1. A method for reading data from a memory device, comprising:
   receiving a memory device read command in the memory device;
   determining whether a received memory device read command is a first type or a second type;
   providing data from the memory device in response to the received memory device read command, including reading the data from a memory array beginning at an address associated with the received memory device read command when the received memory device read command is the first type, and including reading the data from a cache in the memory device when the received memory device read command is the second type; and
   reading data from the memory array into the cache in response to the received memory device read command.
2. The method of clause 1, wherein receiving the memory device read command comprises reading a Serial Peripheral Interface (SPI) read command.
3. The method of clause 2, further comprising:
   receiving, by a SPI controller coupled to the memory device, a host system read request;
   determining, by the SPI controller, whether the host system read request indicates beginning at a next address continuing from a last address associated with a preceding host system read request; and
   providing, by the SPI controller, the memory device read command to the memory device, wherein the memory device read command is the first type when the host system read request does not indicate beginning at the next address continuing from the last address, and wherein the memory device read command is the second type when the host system read request indicates beginning at the next address continuing from the last address.
4. The method of clause 3, further comprising:
   providing, by the SPI controller to the memory device, at least one address cycle and at least one dummy cycle in association with the memory device read command when the memory device read command is the first type; and
   providing, by the SPI controller to the memory device, no address cycle and no dummy cycle in association with the memory device read command when the memory device read command is the second type.
5. The method of any of clauses 1-4, further comprising:
   storing, in the memory device, a last address read from the memory array after reading all data responsive to the received memory device read command;
   wherein reading data from the memory array into the cache includes reading the data from the memory array beginning at the last address when the received memory device read command is the second type.
6. The method of any of clauses 1-5, wherein the memory device is a NOR flash memory device or a pseudo-static random access memory (PSRAM) device.
7. The method of any of clauses 1-6, wherein reading data from the memory array into the cache in response to the received memory device read command comprises reading a number of bytes equal to a sum of a number of address cycles and a number of dummy cycles.
8. The method of any of clauses 1-7, wherein the data comprise processor instructions.
9. A system in a memory device, comprising:
   a cache; and
   read control circuitry configured to:
      determine whether a received memory device read command is a first type or a second type;
   provide data from the memory device in response to the received memory device read command, wherein the read control circuitry is configured to read the data from a memory array beginning at an address associated with the received memory device read command when the received memory device read command is the first type, and wherein the read control circuitry is configured to read the data from a cache in the memory device when the received memory device read command is the second type, and
   read data from the memory array into the cache in response to the received memory device read command.
10. The system of clause 9, wherein the read control circuitry is further configured to:
    store a last address read from the memory array after reading all data responsive to the received memory device read command;
    wherein the read control circuitry is configured to read the data from the memory array beginning at the last address when the received memory device read command is the second type.
11. The system of clause 9 or 10, wherein the memory device is a NOR flash memory device or a pseudo-static random access memory (PSRAM) device.
12. The system of any of clauses 9-11, wherein the read control circuitry is configured to read data from the memory array into the cache by being configured to read a number of bytes equal to a sum of a number of address cycles and a number of dummy cycles.
13. The system of any of clauses 9-12, wherein the data comprise processor instructions.
14. A memory controller, comprising:
    memory controller circuitry configured to communicate storage transactions with a host system and to communicate the storage transactions with a memory device; and
    read command selection circuitry configured to:
    determine whether a host system read request indicates beginning at a next address continuing from a previous address associated with a preceding host system read command; and
    indicate to the memory controller circuitry to use the first type of memory device read command when the host system read request does not indicate beginning at the next address continuing from the previous address, and indicate to the memory control circuitry to use the second type of memory device read command when the host system read request indicates beginning at the next address continuing from the previous address.
15. The memory controller of clause 14, wherein the memory controller circuitry is configured to communicate with the memory device using serial peripheral interface (SPI) protocol.
16. The memory controller of clause 14 or 15, wherein the memory controller circuitry is configured to communicate storage transactions with the host system using a host system bus protocol.
17. The memory controller of any of clauses 14-16, wherein the memory controller circuitry is configured to:
    provide to the memory device at least one address cycle and at least one dummy cycle in association with the memory device read command when the memory device read command is the first type; and provide to the memory device no address cycle and no dummy cycle in association with the memory device read command when the memory device read command is the second type.

18. The memory controller of any of clauses 14-17, wherein the memory device is a NOR flash memory device or a pseudo-static random access memory (PSRAM) device.

19. The memory controller of any of clauses 14-18, wherein the data comprise processor instructions.

20. The memory controller of any of clauses 14-19, wherein the host system comprises a processor, and the processor and the memory controller are coupled together via a system bus on a system-on-a-chip.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for reading data from a memory device, comprising:
   providing on a first chip:
      a serial peripheral interface (SPI) memory controller;
   providing on a second chip:
      a memory device that includes flash memory control circuitry that includes read control circuitry and a cache, and a flash memory array coupled to the flash memory control circuitry;
   receiving, by the SPI memory controller coupled to the memory device, a host system read request;
   determining, by the SPI controller, whether the host system read request indicates beginning at a next address continuing from a last address associated with a preceding host system read request;
   providing, by the SPI controller, the memory device read command to the memory device, wherein the memory device read command is the first type when the host system read request does not indicate beginning at the next address continuing from the last address, and wherein the memory device read command is the second type when the host system read request indicates beginning at the next address continuing from the last address;
   receiving the memory device read command with the read control circuitry;
   determining with the read control circuitry whether the received memory device read command is a first type or a second type;
   providing data from the memory device in response to the received memory device read command, including reading the data from the flash memory array beginning at an address associated with the received memory device read command when the received memory device read command is the first type, and including reading the data from the cache when the received memory device read command is the second type;
   reading data with the read control circuitry from the flash memory array into the cache in response to the received memory device read command; and
   storing in a register that is part of the read control circuitry, a last address read from the flash memory array after reading all data responsive to the received memory device read command, the read control circuitry reads data from the flash memory array into the cache starting at the last address stored in the register when the received memory device read command is the second type.

2. The method of claim 1, further comprising:
   providing, by the SPI controller to the memory device, at least one address cycle and at least one dummy cycle in association with the memory device read command when the memory device read command is the first type; and
   providing, by the SPI controller to the memory device, no address cycle and no dummy cycle in association with the memory device read command when the memory device read command is the second type.

3. The method of claim 1, wherein the memory device is a NOR flash memory device or a pseudo-static random access memory (PSRAM) device.

4. The method of claim 1, wherein reading data from the memory array into the cache in response to the received memory device read command comprises reading a number of bytes equal to a sum of a number of address cycles and a number of dummy cycles.

5. The method of claim 1, wherein the data comprise processor instructions.

6. A system in a memory device, comprising:
   a first chip that comprises a serial peripheral interface (SPI) memory controller;
   a second chip that comprises: a memory device that includes flash memory control circuitry that includes read control circuitry and a cache, and a flash memory array coupled to the flash memory control circuitry; and
   wherein the SPI memory controller is coupled to the memory device, the SPI memory controller receiving a host system read request and determining whether the host system read request indicates beginning at a next address continuing from a last address associated with a preceding host system read request;
   the SPI controller providing the memory device read command to the memory device, wherein the memory device read command is the first type when the host system read request does not indicate beginning at the next address continuing from the last address, and wherein the memory device read command is the second type when the host system read request indicates beginning at the next address continuing from the last address;
   wherein the read control circuitry is configured to:
      determine whether the received memory device read command is a first type or a second type;
      provide data from the memory device in response to the received memory device read command, wherein the read control circuitry is further configured to read the data from the flash memory array beginning at an address associated with the received memory device read command when the received memory device read command is the first type, and wherein the read control circuitry is configured to read the data from the cache when the received memory device read command is the second type,
   the read control circuitry reading data from the flash memory array into the cache in response to the received memory device read command; and
   a register that is part of the read control circuitry storing a last address read by the read control circuitry from the flash memory array after reading all data responsive to the received memory device read command, the read control circuitry reads data from the flash memory array into the cache starting at the last address stored in the register when the received memory device read command is the second type.

7. The system of claim 6, wherein the read control circuitry is configured to read the data from the flash memory array beginning at the last address in the register when the received memory device read command is the second type.

8. The system of claim 6, wherein the memory device is a NOR flash memory device or a pseudo-static random access memory (PSRAM) device.

9. The system of claim 6, wherein the read control circuitry is configured to read data from the flash memory array into the cache by being configured to read a number of bytes equal to a sum of a number of address cycles and a number of dummy cycles.

10. The system of claim 6, wherein the data comprise processor instructions.

11. A memory controller system, comprising:
serial peripheral interface (SPI) memory controller circuitry on a first chip configured to communicate storage transactions with a host system and to communicate the storage transactions with a memory device using a SPI protocol;
the memory device comprising a second chip that includes flash memory control circuitry having read control circuitry and a cache; the read control circuitry receiving first and second types of memory device read commands transmitted by the SPI memory controller circuitry on the first chip; the memory device further including a flash memory array on the second chip and coupled to the flash memory control circuitry; a register that is part of the read control circuitry storing a last address read by the read control circuitry from the flash memory array after reading all data responsive to either the first type or second type memory device read command, the read control circuitry reads data from the flash memory array into the cache starting at the last address stored in the register when the read control circuitry receives the second type of memory device read command;
read command selection circuitry on the first chip that is part of the SPI memory controller configured to:
determine whether a host system read request indicates beginning at a next address continuing from a previous address associated with a preceding host system read command; and
indicate to the flash memory controller circuitry to use the first type of memory device read command when the host system read request does not indicate beginning at the next address continuing from the previous address, and indicate to the flash memory control circuitry to use the second type of memory device read command when the host system read request indicates beginning at the next address continuing from the previous address.

12. The memory controller system of claim 11, wherein the memory controller circuitry is configured to communicate storage transactions with the host system using a host system bus protocol.

13. The memory controller system of claim 11, wherein the memory controller circuitry is configured to:
provide to the memory device at least one address cycle and at least one dummy cycle in association with the memory device read command when the memory device read command is the first type; and
provide to the memory device no address cycle and no dummy cycle in association with the memory device read command when the memory device read command is the second type.

14. The memory controller system of claim 11, wherein the memory device is a NOR flash memory device or a pseudo-static random access memory (PSRAM) device.

15. The memory controller system of claim 11, wherein the data comprise processor instructions.

16. The memory controller system of claim 11, wherein the host system comprises a processor, and the processor and the memory controller are coupled together via a system bus on a system-on-a-chip.

* * * * *